United States Patent Office 2,927,098
Patented Mar. 1, 1960

2,927,098

ELASTOMERIC COMPOSITIONS

Earl J. Goldberg, Wilmington, Del., assignor to E. I. du Pont de Nemours and Company, Wilmington, Del., a corporation of Delaware No Drawing. Application July 5, 1956
Serial No. 595,814

16 Claims. (Cl. 260—77.5)

This invention relates to novel, curable polyurethane and polyurethane-polyurea polymers, and more particularly to thermally stable polymers having no nitrogen atoms in the urethane or urea groups to which hydrogen atoms are attached and having side chains containing potential curing sites.

Heretofore, various valuable elastomeric condensation products have been prepared and cured by using various polyisocyanates. As typical of the many methods has been the preparation of an elastomer from a polyalkyleneether glycol, an organic diisocyanate and a chain-extending agent. Other glycols, such as polyalkyleneether-thioether glycols, polyalkylene-aryleneether glycols, polyalkylene-aryleneether-thioether glycols, and polyaliphatic hydrocarbon glycols have also been used. All of these elastomers, when cured with polyisocyanates, have exhibited outstanding properties such as abrasion resistance and low temperature properties. However, they have generally been found to be somewhat unsatisfactory in regard to thermal stability at high temperatures. While the cause of this thermal instability is not entirely known, it is generally believed that there are groupings in these elastomers where it is possible for thermal fission to take place through a shift of hydrogen atoms with subsequent regeneration of isocyanate groups.

It is an object of the present invention to provide novel, curable, and thermally stable polymers. A further object is to provide polyurethane polymers and polyurethane-polyurea polymers having no nitrogen atoms in the urethane or urea groups to which hydrogen atoms are attached, said polymers having side chains containing potential curing sites. A still further object is to provide a process for the preparation of these novel polymers. Other objects will appear hereinafter.

These and other objects of the following invention are accomplished by providing novel, curable polymers which are comprised essential of the recurring units $$\left[ \overset{R}{\underset{|}{N}} - \left( B - \overset{R}{\underset{|}{N}} - X - \overset{R}{\underset{|}{N}} \right)_n - B - \overset{R}{\underset{|}{N}} - \left( Q - \overset{R}{\underset{|}{N}} - B - \overset{R}{\underset{|}{N}} \right)_m \right]$$

wherein the bivalent radical X is obtained by removing the terminal chlorine atoms from a polymeric bischloroformate having a molecular weight of at least 875 and having the formula $$Cl-\overset{O}{\underset{\|}{C}}-O-G-O-\overset{O}{\underset{\|}{C}}-Cl$$

wherein O–G–O is a bivalent radical obtained by removing the terminal hydrogen atoms from a polymeric glycol selected from the group consisting of polyalkyleneether glycols, polyalkylene-aryleneether glycols, polyalkyleneether-thioether gycols, polyalkylene-aryleneether-thioether glycols and glycols of the formula HO—L—OH wherein L is a bivalent radical formed by the polymerization of ethylenically unsaturated hydrocarbon monomers at least 50% of which are conjugated dienes, and said glycols substituted by a side chain containing a potential curing site in the form of an aliphatic $$-\overset{|}{C}=\overset{|}{C}-$$

group, with the remaining valences on the carbon atoms of said aliphatic $$-\overset{|}{C}=\overset{|}{C}-$$

group being satisfied by monovalent substituents; B is a bivalent radical selected from the group consisting of alkylene radicals, arylene radicals and said radicals substituted by a radical containing a potential curing site in the form of a group selected from the class consisting of a hydroxyl group and an aliphatic $$-\overset{|}{C}=\overset{|}{C}-$$

group with the remaining valences on the carbon atoms of said aliphatic $$-\overset{|}{C}=\overset{|}{C}-$$

group being satisfied by monovalent substituents; R is an aliphatic substituent selected from the group consisting of alkyl radicals, alkylene radicals, hydroxyl alkyl radicals, alkenyl radicals, alkenyloxy radicals and akenyl carbonyloxy radicals; with the proviso that when R is an alkylene radical, B is an alkylene radical, and the R's on both sides of the B radical are joined to form an alkylene radical so that the unit $$-\overset{R}{\underset{|}{N}}-B-\overset{R}{\underset{|}{N}}-$$

is a diazacycloalkylene ring; Q is a radical selected from the group consisting of a carbonyl radical and a non-polymeric diacyl radical; $n$ is an integer greater than zero and $m$ is an integer including zero; said recurring units being connected by a radical selected from the group consisting of Q and X radicals, said radicals having the significance defined above; with at least 60% of the total weight of the polymer being the bivalent radicals X; with the proviso that said curable polymers contain at least one potential curing site for every 8000 units of molecular weight of polymer, said potential curing site being in the form of a group selected from the class consisting of a hydroxyl group, a cyclobutene group and a side chain aliphatic $$-\overset{|}{C}=\overset{|}{C}-$$

group with the remaining valences on the carbon atoms of the $$-\overset{|}{C}=\overset{|}{C}-$$

group being satisfied by monovalent substituents.

The polymers of the present invention are characterized by having no urethane or urea nitrogens substituted with hydrogen atoms and, in addition, these polymers contain potential curing sits which are in the form of a hydroxyl group, a cyclobutene group or an aliphatic C=C group.

The novel polymers of the present invention may be conveniently prepared by several procedures; however, in general, the reaction involved is that between a bischloroformate of a polymeric glycol and a secondary diamine. Other processes which may be used involve the reaction of a bischloroformate of a polymeric glycol with a molar excess of a secondary diamine followed by the reaction with a non-polymeric bischloroformate or a compound such as phosgene. It is to be understood that various modifications may be made in the processes of preparing the novel polymers of the present invention and that in any particular process which is used, mixtures of the various reactants, such as two or more different bischloroformates of polymeric glycols, may be used.

The bischloroformates of the polymeric glycols which are useful for preparing the polymers of the present invention are compounds having the formula Cl—COO—G—OOC—Cl, wherein G is a bivalent organic radical having a molecular weight of at least about 716. These compounds may be prepared by the reaction of a high molecular weight glycol and phosgene. For purposes of the present invention, the bischloroformates of the polymeric glycols which are useful have molecular weights of at least 875; however, they may be as high as about 10,000. In general, molecular weights of about 875 to 5000 are preferred. It is to be understood that when these bischloroformates have side chains containing potential curing sites such as hydroxyl group or an aliphatic C=C group, the molecular weight of the bischloroformate will be increased in accordance with the molecular weight of the side chain.

Various high molecular weight glycols, such as polyalkyleneether glycols, polyalkyleneether-thioether glycols, polyalkylene-aryleneether glycols, polyalkylene-aryleneether-thioether glycols, and polyaliphatic hydrocarbon glycols may be used to form the bischloroformates which are useful in the present invention. In general, the polyalkyleneether glycols are preferred. These compounds may be represented by the formula $HO(GO)_nH$, wherein G is an alkylene radical and $n$ is an integer sufficiently large that the polyalkyleneether glycol has a molecular weight of at least 750. Not all of the alkylene radicals present need be the same. These compounds are ordinarily derived from the polymerization of cyclic ethers, such as alkylene oxides or dioxolane, or from the condensation of glycols. The preferred polyalkyleneether glycol is polytetramethyleneether glycol, also known as polybutyleneether glycol. Polyethyleneether glycol, polypropyleneether glycol, 1,2-polydimethylethyleneether glycol and polydecamethyleneether glycol are other typical representatives of this class. It is to be understood that other polyalkyleneether glycols may be used, such as the copolymerization product of tetrahydrofuran and 1-allyloxy-2,3-epoxy propane. This latter polyalkyleneether glycol will have a side chain allyloxy group.

Another class of polymeric glycols which may be used are the polyalkyleneether-thioether glycols which may be represented by the formula $HO(GY)_nH$, wherein G represents hydrocarbon radicals at least some of which are alkylene, Y represents chalcogen atoms some of which are sulfur and the rest oxygen, and $n$ is an integer sufficiently large so that the glycol has a molecular weight of at least 750. These glycols may be conveniently prepared by condensing together various glycols and thiodiglycol in the presence of a catalyst such as p-toluene sulfonic acid.

Another useful class of glycols are the polyalkylene-aryleneether glycols. These glycols are similar to the polyalkyleneether glycols except that some arylene radicals are present. The phenylene, naphthylene and anthracene radicals may be used with or without substituents such as alkyl or alkylene groups, and, in general, there should be at least one alkyleneether radical having a molecular weight of about 500 for each arylene radical which is present. When part of the ether oxygens are replaced with sulfur, a polyalkylene-aryleneether-thioether glycol results, which may also be used in the present invention.

The bischloroformates of polyaliphatic hydrocarbon glycols may also be used. The aliphatic portion of these glycols may be either saturated or unsaturated; however, in general, the unsaturated compounds are preferred. They may be conveniently prepared by polymerizing appropriate polymerizable ethylenically unsaturated monomers, at least 50% of which are conjugated dienes.

As mentioned above, the polymers of the present invention may be prepared by several general procedures involving the reaction of the bischloroformate of the polymeric glycol with a secondary diamine. Any secondary diamine may be used, such as an aliphatic, cycloaliphatic, aromatic or heterocyclic diamine. The reaction involved is that of the available hydrogen atom on the secondary amino group with the chlorine atom of the bischloroformate so as to provide a urethane linkage having no hydrogen attached to the urethane nitrogen. As representative of the various types of secondary diamines which may be used in preparing the polymers of the present invention, the following may be mentioned: N,N'-dimethylethylene diamine, piperazine, N,N'-diallylethylene diamine, N,N'-di(β-hydroxyethyl)ethylene diamine, 4,4'-methylene-bis(N-methylaniline), N,N'-diethyl benzidine, N,N'-di-(β-hydroxyethyl)-p-phenylene diamine, 4,4'-(3-butenylidene)-bis(N-methylaniline), and N,N'-diisobutylhexamethylene diamine.

When the novel polymers of the present invention are prepared by using a bischloroformate of a non-polymeric glycol in addition to the secondary diamine and bischloroformate of the polymeric glycol reactants, any low molecular weight, non-polymeric glycol may be used. Here again the bischloroformate of this glycol is prepared by using phosgene. This low molecular weight, non-polymeric glycol may be an aliphatic, cycloaliphatic or aromatic compound and, in general, the molecular weight should not be above about 272. It is to be understood that this low molecular weight, non-polymeric glycol bischloroformate reactant may have one or more side chains containing the potential curing sites. Representative glycols which may be used include 4-methyl-3-cyclohexene-1,1-dimethanol,
3,cyclohexene-1,1-dimethanol,
3-(allyloxy)-1,2-propanediol,
2-[(allyloxy)methyl]-2-methyl-1,3-propanediol,
2-vinyl-1,3-propanediol,
3-(2-methylallyloxy)-1,2-propanediol,
2,2'-(4-allyl-m-phenylene-dioxy)diethanol,
3-(4-allyl-2-methoxyphenoxy)-1,2-propanediol,
3-(o-allylphenoxy)-1,2-propanediol,
2-[(allyloxy)ethyl]-1,3-propanediol,
2-methyl-2-[(4-pentenyloxy)methyl]-1,3-propanediol,
2-[(allyloxy)ethyl]-2-methyl-1,3-propanediol,
2-methyl-2-[(10-undecenyloxy)methyl]-1,3-propanediol,
2,2'-(allylimino)-diethanol,
2-[(3-methylallyloxy)methyl]-2-methyl-1,3-propanediol,
2-[(allyloxy)methyl]-1,3-propanediol,
3-(o-propenylphenoxy)-1,2-propanediol,
3-(p-propenylphenoxy)-1,2-propanediol, and
3-(4-allyl-2-methoxyphenoxy)-1,2-propanediol For purposes of the present invention, the 1,3-propanediols of the formula

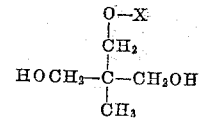

wherein X is a hydrocarbon radical bearing a terminal aliphatic —CH=CH₂ group, are of particular value.

In preparing the polymers of the present invention, it is necessary merely to mix the secondary diamine with the polymeric glycol bischloroformate, or any other reactant such as the non-polymeric glycol bischloroformate, in suitable mixing equipment, in the presence of an acid acceptor. Generally, the bischloroformates are dissolved in an organic solvent and the amine is dissolved or suspended in water with the acid acceptor. The mixing is generally carried out at room temperature with efficient agitating. The polymer is collected and washed free of contaminants with hot water and normally is freed of residual solvent and water by milling on a hot rubber roll mill. It is generally desirable to utilize substantially equimolar proportions of reactants in the preparation of these polymers in order to provide polymers of reasonably high molecular weights. Thus, the amount of secondary diamine used should be substantially equivalent to that amount which is required to react with terminal chlorine atoms of the bischloroformate reactants.

The preparation of polymers within the scope of the present invention will be illustrated by several representative reactions. In the case where a polymeric glycol bischloroformate, such as a polytetramethyleneether bischloroformate, is reacted with a secondary diamine, such as N,N'-di(β-hydroxyethyl)ethylene diamine, in substantially equimolar proportion, the resulting polymer will be comprised essentially of the recurring units

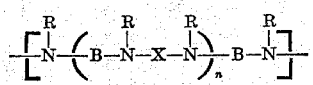

wherein X is a bivalent radical obtained by removing the terminal chlorine atoms from a polytetramethyleneether bischloroformate having a molecular weight of at least 875 and would have the structure,

—CO—O—G—O—CO— wherein G would be a tetramethyleneether radical; B would be an ethylene radical; the R's would be hydroxyethyl group; n would be an integer greater than zero; and these recurring units would be connected by X radicals. It is to be understood that in any given polymer, the X, B and R radicals need not all necessarily be the same. Thus, two or more polymeric glycol bischloroformates may be used, such as a polytetramethyleneether bichloroformate and a polyalkyleneether-theioether bischloroformate or another polyalkyleneether glycol derived by copolymerizing tetrahydrofuran with 1-allyloxy-2,3-epoxy propane. Likewise, two or more secondary diamines may be used, such as N,N'-di(β-hydroxyethyl) ethylene diamine, methylenebismethylaniline, 9-10-bis (β-hydroxyethylaminomethyl)anthracene, etc. When a secondary diamine such as piperazine hexahydrate is used to react with the polymeric bischloroformate, it is readily apparent that the

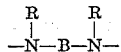

section of the above identified formula will be a diazacycloalkylene ring. It is to be understood that when the secondary diamine reactant does not contain a potential curing site, it is necessary that this curing site be on the bischloroformate reactant.

As mentioned above, polymers within the scope of the present invention may be prepared by using, in addition to the polymeric glycol bischloroformate and the secondary diamine, other reactants, such as bischloroformates of non-polymeric glycols, phosgene or other carbonyl chlorides. Thus, in the case where a polymer is prepared by reacting a polymeric glycol bischloroformate, such as a polytetramethyleneether bischloroformate with a molar excess of a secondary diamine, such as methylene bis-N-methylaniline, followed by the reaction with a non-polymeric bischloroformate such as 2-[(allyloxy)methyl]-2-methyl-1,3-propane-bischloroformate, the resulting polymer will be comprised essentially of the recurring units

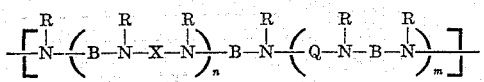

wherein X is a bivalent radical obtained by removing the terminal chlorine atoms from a polytetramethyleneether bischloroformate, B is the arylene radical

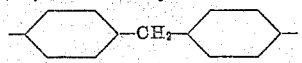

the R's are methyl groups; Q is a diacyl radical which is derived from the non-polymeric bischloroformate which contains an allyloxy side chain group; n and m are both integers greater than zero; and the recurring units will be connected by a diacyl radical Q. Here again it is to be understood that mixtures of two or more of any of the various reactants may be used.

It is quite obvious that Q in the above recited formula may represent a wide variety of diacyl radicals, depending on reactants which are present in addition to the polymeric glycol bischloroformate and the secondary diamine. Thus, when the bischloroformate of a non-polymeric glycol such as 2-[(allyloxy)methyl]-2-methyl-1,3-propanediol is used, Q will be the diacyl radical

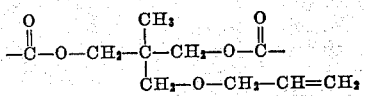

When a compound such as 1-methylcyclobutene-2,3-dicarbonyl chloride is used, Q will be the diacyl radical

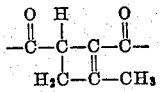

It is quite obvious that other carbonyl chlorides such as terephthaloyl chloride and methylene-bis-(N-methylphenylcarbamyl chloride) may be used. In addition, polymers may be prepared within the scope of the present invention wherein phosgene is used as another reactant, in which case Q will be a carbonyl group.

With any process which is used to prepare polymers within the scope of the present invention, it is to be understood that the radicals which result from the polymeric bischloroformate reactants, i.e., the bivalent radicals X, should comprise at least about 60% of the total weight of the polymer. This limitation is imposed so that the polymeric products have desirable elastic properties. Since these polymers have potential curing sites in the form of hydroxyl groups, cyclobutene groups or aliphatic C=C groups, cyclobutene groups, it is desirable that there be at least one of these curing sites present for every 8000 units of molecular weight of polymer in order that the polymer may be adequately cured. It is to be understood that there may be more cross-linking sites present and that the number of cross-linking sites may be in excess of the number utilized in the curing step. On the average, it is preferred to have not more than about one cross-linking site per 400 units of molecular weight of polymer. It is to be understood in any given polymer, both types of potential curing sites may be present.

Since the novel polymers of the present invention have potential curing sites, they may be cured by various general procedures to provide highly useful elastomeric products. The particular curing procedure used will depend on the type of structure which is present in the various radicals, X, B, R and Q, of the above recited general formula. However, in general, it is desirable to use either an organic polyisocyanate curing procedure involving the use of the side chain hydroxyl group or a sulfur curing procedure involving the use of the side chain containing an aliphatic C=C group.

In the case of an organic polyisocyanate cure, it is generally preferred to use an organic diisocyanate which may be of the aromatic, aliphatic or cycloaliphatic type. Representative compounds include, toluene-2,4-diisocyanate, m-phenylene diisocyante, 4-chloro-1,3-phenylene diisocyanate, 4,4'-biphenylene diisocyanate, 1,5-naphthylene diisocyanate, 1,4-tetramethylene diisocyanate, 1,6-hexamethylene diisocyanate, 1,10-decamethylene diisocyanate, 1,4-cyclohexylene diisocyanate, 4,4'-methylene-bis(cyclohexyl isocyanate), 1,3-bis(3-isocyanato-p-tolyl)urea, 4,4'-methylenedi-o-tolylisocyanate, and 1,5-tetrahydronaphthylene diisocyanate. In practice, the addition of a molar equivalent or less of a diisocyanate, based on the hydroxyl content of the uncured reaction product, is adequate for the curing of the products. The diisocyanate may conveniently be mixed with the uncured product on a rubber mill and the mixture may then be cured by placing it in a mold and heating under pressure. Only enough pressure is required to force the elastomer to assume the shape of the mold. The temperatures and pressures used in ordinary rubber processing are satisfactory for use in curing the elastomers of this invention. Pressures of 50 to 1000 pounds per square inch or higher and temperatures of from 80 to 175° C. are ordinarily satisfactory. Most of the polymers of this invention may conveniently be cured or vulcanized by heating at 130 to 135° C. for about 2 hours. The diisocyanate curing procedure should be carried out under substantially anhydrous conditions.

When the novel polymers of the present invention have side chains containing aliphatic C=C groups, such as the polymers which are prepared by using N,N'-diallylethylene diamine, curing may be effected by utilizing a sulfur curing procedure. This is effected by utilizing, in general, about 0.5 to 8 parts of sulfur per 100 parts of elastomer in the presence of appropriate accelerators. Curing at a temperature of about 125 to 160° C. for from one-half to several hours is generally sufficient. It is to be understood that various modifications of the sulfur cure may be employed depending on the type of polyurethane used. Various procedures and modifications of sulfur curing are more particularly described in Encyclopedia of Chemical Technology, Kirk and Orthmer, published by the Interscience Encyclopedia, Inc., New York, 1953, vol. 11, pages 892–927; Principles of High-Polymer Theory and Practice, Schmidt and Marlies, published by McGraw-Hill Book Company, Inc., New York, 1948, pages 556–566; and Chemistry and Technology of Rubber, Davis and Blake, published by Reinhold Publishing Corporation, New York, 1937, vol. 74, chapter VI.

Another type of curing procedure which may be used is that involving heat alone when the polymer contains a cyclobutene ring, such as a polymer falling within the scope of the above recited general formula wherein the diacyl radical is derived from 1-methylcyclobutene-2,3-dicarbonyl chloride. This curing procedure appears to result from the thermal cleavage of the cyclobutene ring. In general, temperatures of about 100–325° C. are usually sufficient to effect such a cure. It is also to be understood that in addition to the organic diisocyanate and sulfur curing procedures which are used, polymers falling within the scope of the present invention which have 1,3-conjugated unsaturation present may be effectively cured by utilizing a Diels-Alder type reaction involving the use of a bismaleimide such as m-phenylene bismaleimide.

The following examples will better illustrate the nature of the present invention; however, the invention is not intended to be limited to these examples. Parts are by weight unless otherwise indicated.

The apparatus used in the high temperature rebound test is constructed as follows: A copper melting point block 4 inches in diameter at the face, which is 0.75 inch thick, having a conical bottom measuring 1.75 inches from the bottom of the face to the apex of the cone and having a hole drilled horizontally into the face to carry a thermometer, is clamped so that the face is level. A Bunsen burner directly under the apex of the cone is the source of heat. A glass cylinder, approximately 1 inch in diameter and having graduations marked on it, is clamped vertically just above the block. Immediately below the cylinder, a sheet of aluminum foil about 1.5 x 1.5 inches square is placed on the copper block. The upper surface of the foil is waxed lightly with a fluorocarbon grease. A specimen of the elastomer in the form of a sheet about 1.25 x 1.25 inches square and about 0.05 to 0.09 inch thick is placed on the aluminum foil. The glass cylinder is then lowered so that it rests firmly on the specimen and is in complete contact with it all around the edge of the cylinder. Steel ball bearings, 0.125 inch in diameter and weighing 0.25 g. each are used for the rebound.

In operation, the copper block is heated so that the temperature rises approximately 25° per minute. A steel ball bearing is dropped into the cylinder from the top and the height to which it bounces on the first bounce is noted. The ball is retrieved from the bottom of the cylinder with a magnet. This operation is continued, 2 to 3 readings being taken at incremental temperatures. The results are recorded in terms of percent of the height of rebound to the total height of fall. The maximum height of rebound is observed as the sample is heated and the temperature at which the rebound decreases 10% from the maximum (T–10) and 40% (T–40) is recorded. These figures are interpolated from a plot of the percent rebound versus temperature.

The smear point value is the temperature at which a trail of molten polymer is left on the copper block when a sample is drawn slowly over the surface while pushing it against the block firmly by hand.

The stress-strain properties of the elastomers are determined by the conventional methods used in the rubber industry.

EXAMPLE 1

250 parts of polytetramethyleneether glycol, having a molecular weight of 1070 is added slowly to 100 parts of liquid phosgene at 0–10° C. while stirring. Vaporized phosgene is returned to the reaction by a reflux condenser. The addition requires about 1 hour and the mixture is stirred an additional hour after the addition is complete. The mass is then allowed to warm up to 25–30° C. and the phosgene permitted to boil off. Finally, nitrogen is blown through the mass until the exit gas shows an absence of phosgene.

25 parts of the polytetramethyleneether bischloroformate thus obtained is dissolved in 67 parts of benzene. To this is added with vigorous agitation a solution of 3.11 parts of piperazine hexahydrate, 0.59 part of N,N'-di($\beta$-hydroxyethyl)ethylene diamine and 2.1 parts of sodium carbonate in 75 parts of water. The mixture is stirred vigorously for 10 minutes at room temperature. 0.25 part of phenyl-$\beta$-naphthylamine is added as an antioxidant and the mixture is poured into 500 parts of water and boiled for 20 minutes. The water is withdrawn and replaced with 500 parts of water and boiled 20 minutes. The water is changed again and boiled for 20 minutes. The polymer is collected and put on a rubber wash mill and washed with water at 40–50° C. for 10 minutes. The polymer is then transferred to a rubber roll mill and dried by milling 10 minutes at 110–120° C. This polymer has an average molecular weight of 3238 per side chain curing site.

To 100 parts of the polymer on a rubber roll mill are added 30 parts of conductive channel black and 8 parts of 3,3'-dimethyl-4,4'-biphenyldiisocyanate and the mass blended by milling 10 minutes at 100° C. The compounded stock is put in molds and cured in a press for 2 hours at 134° C. The resulting, tough, resilient elastomer has the following properties:

Tensile strength at break, 25° C., lbs./sq. in. _____ 2200
Modulus at 300% elongation, 25° C., lbs./sq. in. __ 1450
Elongation at break, 25° C., percent _____ 400
Maximum rebound, percent _____ 58
T–10, ° C. _____ 265
Smear point, ° C. _____ 335

EXAMPLE 2

1000 parts of polytetramethyleneether glycol, having a molecular weight of 955, is added slowly to 400 parts of liquid phosgene at 0–10° C. while stirring and returning vaporized phosgene by a reflux condenser. The addition requires 1 hour and stirring is continued for 1 hour longer. The excess phosgene is then allowed to boil off as the mass warms to room temperature. The residual phosgene is removed by flowing dry nitrogen through the mass at 25–30° C. until the exit gas no longer shows a test for phosgene.

21.6 parts of the resulting polytetramethyleneether bischloroformate is dissolved in 67 parts of benzene. To this is added with vigorous stirring a solution of 3.26 parts of N,N'-di(β-hydroxyethyl)ethylene diamine and 4.5 parts of sodium carbonate in 75 parts of water. After the addition is complete, stirring is continued 10 minutes. 0.2 part of phenyl-β-naphthylamine is added and the mass is poured into 500 parts of water. The mass is boiled for 20 minutes, the water changed and boiled for 20 minutes longer and repeated. The polymer is collected and washed on a rubber wash mill with water at 40–50° C. for 10 minutes. It is then transferred to a rubber roll mill and dried by milling at 110–120° C. for 10 minutes. This polymer has an average molecular weight of 614 per side chain curing site.

100 parts of the polymer, 30 parts of conductive channel black and 8 parts of 3,3'-dimethyl-4,4'-biphenyldiisocyanate are compounded on a rubber roll mill at 100° C. for 10 minutes. The compounded stock is cured in molds in a press for 1 hour at 150° C. to yield a tough, resilient elastomer. It has a maximum rebound of 74%, a T–10 value of 300° C. and a smear point of 400° C.

EXAMPLE 3

24 parts of the polytetramethyleneether bischloroformate of Example 1 is dissolved in 67 parts of dry benzene. To this is added with vigorous stirring a solution of 2.8 parts of N,N'-diallylethylene diamine and 4.5 parts of sodium carbonate in 75 parts of water. The mixture is then stirred vigorously for 10 minutes at room temperature. 0.2 part of phenyl-β-naphthylamine is added and the mixture is poured into 500 parts of water and boiled for 20 minutes. It is boiled successively for 20 minutes each with two more 500-part portions of water. The polymer is collected and dried by milling for 10 minutes at 110–120° C. on a rubber roll mill. This polymer has an average molecular weight of 668 per side chain curing site.

100 parts of the polymer is compounded on a rubber roll mill with 30 parts of conductive channel black, 4 parts of sulfur, 9 parts of 2,2'-dithiobisbenzothiazole, and 2 parts of 2-mercaptobenzothiazole by milling for 10 minutes at 50° C. The compounded stock is cured in molds in a press for 2 hours at 150° C. The tough, resilient elastomer has a maximum rebound of 66%, a T–10 value of 260° C. and a smear point of 365° C.

EXAMPLE 4

24 parts of the polytetramethyleneether bischloroformate of Example 1 is dissolved in 67 parts of dry benzene and put in a vessel equipped with vigorous agitation. To the vigorously agitated solution is added gradually and simultaneously (1) a solution of 1.63 parts N,N'-di(β-hydroxyethyl)ethylene diamine and 4.5 parts sodium carbonate in 75 parts of water and (2) 2.26 parts methylene-bis-(N-methylaniline) in 17 parts benzene. The mixture is then stirred an additional 10 minutes, the temperature remaining at room temperature. Then 0.25 part phenyl-β-naphthylamine is added as an antioxidant.

The emulsion is poured into 500 parts of water with stirring and the mixture boiled for 20 minutes. The water layer is then removed, another 500-part portion of water is added and boiled for 20 minutes. The operation is then repeated. The polymer is collected and washed on a rubber wash roll mill for 15 minutes with 40–50° C. water. The polymer is dried by milling on a smooth rubber roll mill at 110–120° C. for 10 minutes. This polymer has an average molecular weight of 1382 per side chain curing site.

100 parts of the polymer, 30 parts conductive channel black and 4 parts 3,3'-dimethyl-4,4'diphenyldiisocyanate are milled together on a rubber roll mill at 100° C. for 10 minutes. The compounded stock is put in molds in a press and cured by heating at 134° C. for 2 hours to yield a tough, resilient elastomer.

On testing, the T–10 value is 285° C. with a maximum rebound of 65%. The smear point is 380° C.

EXAMPLE 5

To 1000 parts of tetrahydrofuran cooled to −40° C. is added gradually 55 parts of fluorosulfonic acid. The temperature is then slowly increased to 15° C. and 500 parts of 1-allyloxy-2,3-epoxy propane is added slowly over a period of 1.3 hours while keeping the temperature between 15 and 25° C. After standing overnight, the mass is steam-distilled to remove unpolymerized tetrahydrofuran. The water layer is separated from the polymer mass which is neutralized with lime, dried, treated with activated carbon and filtered to give a nearly colorless polyether glycol. 0.5 part of phenyl-β-naphthylamine is added as an antioxidant. The molecular weight, as determined by hydroxyl number is 2525 and the iodine number is 77.7, indicating one allyl side chain per 326 molecular weight.

160 parts of this polyalkyleneether glycol containing an alliphatic C=C side chain group is added slowly to 100 parts of liquid phosgene at 0–15° C., the vaporized phosgene being returned to the reaction by a reflux condenser. After the addition is complete, stirring is continued for 1 hour and then the excess phosgene is allowed to boil off, after which the mass is blown with dry nitrogen until the exit gases show no test for phosgene.

8 parts of the resulting polyalkyleneether bischloroformate and 24 parts of the polytetramethyleneether bischloroformate of Example 1 are dissolved in 67 parts of dry benzene in a vessel equipped with vigorous agitation. To this solution is added with vigorous agitation at room temperature a solution of 4.7 parts of piperazine hexahydrate and 4.7 parts of sodium carbonate in 75 parts of water. Stirring is continued for 10 minutes after the addition is complete. 0.3 part of phenyl-β-naphthylamine is added as an antioxidant and the mass is poured into 700 parts of water. The water is heated to boiling and after 20 minutes, the water is replaced with 700 parts of fresh water. It is boiled 20 minutes and the operation repeated. The polymer is collected, washed on a rubber wash roll mill for 10 minutes with 40–50° C. water and then dried on a smooth roll mill at 110–120° C. for 10 minutes. This polymer has an average molecular weight of 1446 per side chain curing site.

100 parts of the polymer is blended on a rubber roll mill at 100° C. with 30 parts of conductive channel black, 4 parts of sulfur, 2 parts of mercaptobenzothiazole, and 9.4 parts of 2,2'-dithiobisbenzothiazole. The compounded stock is cured in molds in a press at 150° C. for 2 hours. The tough, resilient elastomer has a T–10 value of 265° C. and a smear point of 350° C.

EXAMPLE 6

A polytetramethyleneether bischloroformate is prepared from 1000 parts of a polytetramethyleneether glycol having a molecular weight of 995 and 1000 parts of liquid phosgene as described in Example 1.

22.4 parts of the polytetramethyleneether bischloroformate thus obtained is dissolved in 67 parts of benzene. To this is added simultaneously 2.88 parts of N,N'-bis(β-hydroxyethyl)-4,4'-diaminodiphenyl ether, 2.26 parts methylene-bis(N-methylaniline) and a solution of 4.5 parts sodium carbonate in 75 parts of water. The mixture is stirred vigorously for 20 minutes. 0.25 part of phenyl-β-naphthylamine is added and the mass is poured into 500 parts of water. The mass is boiled 20 minutes, the water changed and boiled for 20 minutes longer. The polymer is collected and washed on a rubber wash mill with water at 40–50° C. for 10 minutes. It is transferred to a rubber mill and dried by milling at 110–120° C. for 10 minutes. This polymer has an average molecular weight of 1304 per side chain curing site.

100 parts of the polymer, 40 parts of conductive channel black and 3.3 parts of 3,3'-dimethyl-4,4'-biphenyldiisocyanate are compounded on a rubber mill at 100° C.

for 10 minutes. The compounded stock is cured in molds in a press for 2 hours at 134° C. The resulting elastomer has the following properties:

| | |
|---|---|
| Tensile strength at break, 25° C., lbs./sq. in. | 3000 |
| Modulus at 300% elongation, 25° C., lbs./sq. in. | 1800 |
| Elongation at break, 25° C., percent | 330 |
| Smear point, ° C. | 355 |

EXAMPLE 7

(A) 44.4 parts of a polytetramethyleneether bischloroformate prepared from a polytetramethyleneether glycol having a molecular weight of 1070 is dissolved in 134 parts of benzene. To this is added simultaneously 6.78 parts of methylene-bis(N-methylaniline), 3.26 parts of 9,10-bis(β-hydroxyethylaminomethyl)anthracene and a solution of 9 parts sodium carbonate in 150 parts of water. The mixture is stirred vigorously for 20 minutes. 0.5 part of phenyl-β-naphthylamine is added and the mass is poured into 1000 parts of water. The mass is boiled 20 minutes, the water changed and boiled for 20 minutes longer. The polymer is collected and washed on a rubber wash mill with water at 40–50° C. for 10 minutes. It is transferred to a rubber mill and dried by milling at 110–120° C. for 10 minutes. This polymer has an average molecular weight of 2575 per side chain curing site.

(B) 100 parts of the polymer prepared in (A) above, 40 parts of conductive channel black and 1.5 parts of m-phenylene-bismaleimide are compounded on a rubber mill at 50–60° C. for 10 minutes. The compounded stock is cured in molds in a press for 1 hour at 140° C. The resulting elastomer has the following properties:

| | |
|---|---|
| Tensile strength at break, 25° C., lbs./sq. in. | 5000 |
| Modulus at 300% elongation, 25° C., lbs./sq. in. | 800 |
| Elongation at break, 25° C., percent | 630 |
| Smear point, ° C. | 290 |

(C) 100 parts of the polymer prepared in (A) above, 40 parts of conductive channel black and 3.5 parts of 3,3′-dimethyl-4,4′-biphenyldiisocyanate are compounded on a rubber mill at 50–60° C. for 10 minutes. The compounded stock is cured in molds in a press for 2 hours at 134° C. The resulting elastomer has the following properties:

| | |
|---|---|
| Tensile strength at break, 25° C., lbs./sq. in. | 5000 |
| Modulus at 300% elongation, 25° C., lbs./sq. in. | 1500 |
| Elongation at break, 25° C., percent | 550 |
| Smear point, ° C. | 370 |

EXAMPLE 8

(A) 25 parts of the polymer prepared in Example 4 is dissolved in 360 parts of benzene. To this is added 2.05 parts of triethylamine and then a solution of 2.6 parts of sorboyl chloride in 10 parts of benzene. The mixture is stirred at room temperature overnight and then is refluxed 1 hour. The mass is poured into 1000 parts of water and boiled 30 minutes. The polymer is collected and washed on a rubber wash mill with water at 40–50° C. for 10 minutes. It is transferred to a rubber mill and dried by milling at 110–120° C. for 10 minutes. This polymer has an average molecular weight of 702 per side chain curing site.

(B) 100 parts of the polymer from (A) above, 30 parts of conductive channel black and 1.54 parts of ethylene-bismaleimide are compounded on a rubber mill at 50–60° C. for 10 minutes. The compounded stock is cured in molds in a press for 1 hour at 140° C. The resulting elastomer has the following properties:

| | |
|---|---|
| Tensile strength at break, 25° C., lbs./sq. in. | 1650 |
| Modulus at 300% elongation, 25° C., lbs./sq. in. | 1050 |
| Elongation at break, 25° C., percent | 370 |
| Smear point, °C. | 400 |

(C) 100 parts of the polymer from (A) above, 30 parts of high abrasion furnace black, 1.5 parts sulfur, 3.0 parts of 2,2′-dithiobisbenzothiazole, 1 part of 2-mercaptobenzothiazole and 0.2 part of zinc chloride are compounded on a rubber mill. The compounded stock is sheeted off the mill and is cured in molds for 2 hours at 140° C. The resulting elastomer has properties similar to the elastomer which was cured in (B) above.

EXAMPLE 9

13.56 parts of methylene-bis(N-methylaniline) is dissolved in 350 parts of benzene. 50 parts of calcium hydroxide is added. The mixture is stirred at room temperature and a solution of 44.4 parts of a polytetramethylene-ether bischloroformate, prepared from a polytetramethylene-ether glycol of molecular weight 1070, in 175 parts benzene is added over a period of 2 hours. The mixture is then stirred overnight and then filtered. The benzene solvent is removed from the filtrate by gradually raising the temperature to 100° C. and reducing the pressure to 1 mm. The resulting polyurethane diamine has a molecular weight of 2752 as determined by titration for aromatic amine end groups.

27.5 parts of this polyurethane diamine is dissolved in 110 parts of benzene. To the solution is added simultaneously 2.85 parts of 2-[(allyloxy)methyl]-2-methyl-1,3-propane-bischloroformate and a solution of 2.5 parts sodium carbonate in 125 parts of water. The mixture is stirred vigorously for 20 minutes. 0.3 part of phenyl-β-naphthylamine is added and the mass is poured into 1000 parts of water. The mass is boiled 20 minutes, the water changed and boiled for 20 minutes longer. The polymer is collected and washed on a rubber wash mill with water at 40–50° C. for 10 minutes. It is transferred to a rubber mill and dried by milling for 10 minutes at 110–120° C. This polymer has an average molecular weight of 2964 per side chain curing site.

100 parts of the polymer, 30 parts of high abrasion furnace black, 3 parts sulfur, 6 parts 2,2′-dithiobisbenzothiazole and 1.5 parts 2-mercaptobenzothiazole are compounded on a rubber mill for 10 minutes at 50–60° C. The compounded stock is cured in molds in a press for 3 hours at 140° C. The resulting elastomer has the following properties:

| | |
|---|---|
| Tensile strength at break, 25° C., lbs./sq. in. | 2850 |
| Modulus at 300% elongation, 25° C., lbs./sq. in. | 2050 |
| Elongation at break, 25° C., percent | 370 |
| Yerzley resilience, 25° C., percent | 74 |
| Smear point, °C. | 365 |

EXAMPLE 10

31.2 parts of the polytetramethyleneether bischloroformate of Example 9 is dissolved in 135 parts of benzene. To this solution is added simultaneously 2.14 parts of N,N′-di-(β-hydroxyethyl)hexamethylene diamine and a solution of 2.5 parts of sodium carbonate in 125 parts of water. The mixture is stirred vigorously for 10 minutes. 0.35 part of phenyl-β-naphthylamine is added and the mass is poured into 1000 parts of water. The mass is boiled and the polymer is washed and dried as above. This polymer has an average molecular weight of 1623 per side chain curing site.

100 parts of the polymer, 30 parts of conductive channel black and 3 parts of 4,4′-diisocyanatodicyclohexylmethane are compounded on a rubber mill for 10 minutes at 50–60° C. The compounded stock is cured in molds in a press for 2 hours at 140° C. The resulting elastomer has the following properties:

| | |
|---|---|
| Tensile strength at break, 25° C., lbs./sq. in. | 4050 |
| Modulus at 300% elongation, lbs./sq. in. | 810 |
| Elongation at break, percent | 600 |
| Yerzley resilience, 25° C., percent | 61 |
| Smear point, °C. | 375 |

EXAMPLE 11

27.52 parts of the polyurethane diamine of Example 9 is dissolved in 110 parts of benzene. To this solution is added simultaneously 1.93 parts of 1-methyl-cyclobutene-2,3-dicarbonyl chloride and a solution of 2.5 parts of sodium carbonate in 125 parts of water. The mixture is stirred vigorously for 20 minutes. 0.3 part of phenyl-β-naphthylamine is added and the mass poured into 1000 parts of water. The mass is boiled and the polymer washed and dried as above. This polymer has an average molecular weight of 2872 per side chain curing site.

100 parts of the polymer is compounded on a rubber mill at 100° C. for 10 minutes with 30 parts of high abrasion furnace black. The compounded stock is cured in molds in a press for 3 hours at 150° C. The resulting elastomer has the following properties:

| | |
|---|---|
| Tensile strength at break, 25° C., lbs./sq. in. | 3800 |
| Modulus at 300% elongation, 25° C., lbs./sq. in. | 1000 |
| Elongation at break, 25° C., percent | 580 |
| Yerzley resilience, percent | 62 |
| Smear point, °C. | 395 |

EXAMPLE 12

(A) 11.1 parts of 4-allyloxy-N,N'-dimethyl-m-phenylene diamine prepared by the lithium hydride reduction of 4-allyloxy-m-phenylene diisocyanate in known manner, is dissolved in 200 parts of benzene and then 5.5 parts of calcium hydroxide is added. To this mixture is added slowly at room temperature with stirring, 154 parts of a benzene solution of a polytetramethyleneether bischloroformate, prepared from a polytetramethyleneether glycol of molecular weight 2990. The addition requires about 1 hour and stirring is continued for 2 hours. The mixture is filtered.

(B) 150 parts of this filtrate is dissolved in 50 parts of benzene. Phosgene is bubbled into the solution at room temperature for 1 hour. The solution is heated slowly to reflux over a 30-minute period with phosgene bubbling through. Phosgene is passed through the refluxing solution for an additional 30 minutes. The solution is then refluxed 3 hours longer. Nitrogen is then blown through the solution until the exit gas is free of phosgene and hydrogen chloride.

(C) To the solution prepared in (B) above is added at room temperature 150 parts of the filtrate from (A) above. 2.5 parts of calcium hydroxide and 50 parts of benzene are added. The mixture is stirred at reflux for 3 days. The mixture is cooled to room temperature and diluted with 500 parts of tetrahydrofuran. The mixture is then centrifuged and the calcium salts separated. 0.2 part of phenyl-β-naphthylamine is added and the solvent is allowed to evaporate. The resulting polymer is milled on a rubber mill for 10 minutes at 100° C. This polymer has an average molecular weight of 1727 per side chain curing site.

100 parts of the polymer, 30 parts of high abrasion furnace black, 1 part of sulfur, 3 parts of 2,2'-dithiobisbenzothiazole, 1 part mercaptobenzothiazole and 0.2 part of zinc chloride are compounded on a rubber mill for 10 minutes at 25–30° C. The compounded stock is cured in molds in a press for 1 hour at 140° C. The resulting elastomer is resilient, has good tensile strength and modulus and a smear point above 330.

EXAMPLE 13

(A) *Preparation of glycol*

66.4 parts of 1,6-hexanediol, 62.4 parts of thiodiglycol, 1.71 parts of p-toluene sulfonic acid monohydrate and 240 parts of benzene are heated for 90 hours at reflux during which time water is azeotropically distilled and removed by means of a Dean-Stark trap. The mass is cooled to room temperature. 120 parts of water and 0.1 part of sulfuric acid are added and the mass is heated at reflux for an hour. Then 4.8 parts of sodium carbonate is added carefully and refluxing is continued for an additional hour. The mass is cooled, 48 parts of ethyl alcohol and 28 parts of methyl alcohol are stirred in and then the mass is allowed to stand, whereupon an aqueous layer separates which is then withdrawn. The upper benzene layer is washed once with a solution of 72 parts water, 48 parts 5% HCl (in water), 48 parts ethyl alcohol, 28 parts methyl alcohol and 6 parts sodium chloride and then twice with a solution of 120 parts water, 48 parts ethyl alcohol, 28 parts methyl alcohol and 6 parts sodium chloride. The benzene solution is then heated to distill off the benzene, finally at 140–150° C. under 1 mm. of mercury pressure and then filtered. The resulting polyhexylene-ethylene ether-thioether glycol analyzes 15.5% sulfur and has a hydroxyl number of 164.

(B) *Preparation of bischloroformate*

51 parts of the above polyether glycol is dissolved in 80 parts of benzene and added slowly to 31 parts of liquid phosgene at 5–8° C. with good agitation. After stirring for half an hour, the temperature is permitted to rise and nitrogen is blown through to remove phosgene. The last traces of phosgene are removed under vacuum.

(C) *Preparation of elastomer*

To the polyether glycol bischloroformate prepared above is added 160 parts of dry benzene and there is then added, with vigorous agitation, a solution of 11 parts of N,N'-diallyl ethylene diamine and 31.7 parts of sodium carbonate in 280 parts of water. Stirring is continued for about 15 minutes after the addition is complete and then the dispersion is poured into 1000 parts of water and it is boiled until the benzene distills off. The water layer is removed and the mass washed with 200 part portions of water. The polymer is dissolved in 250 parts of tetrahydrofuran and the excess alkali neutralized with 1 normal hydrochloric acid. The solution is dried over anyhydrous magnesium sulfate, filtered and the tetra-hydrofuran evaporated. This polymer has an average molecular weight of 437 per side chain curing site.

100 parts of the polymer, 30 parts of high abrasion furnace black, 2 parts of sulfur, 4 parts 2,2'-dithiobisbenzothiazole and 0.4 part of zinc p-methoxydithiocarbanilate are compounded on a rubber mill and then heated in a mold in a press at 140° C. for 1 hour to give a soft, resilient elastomer.

The elastomers prepared according to this invention have many varied uses. They may be employed in the preparation of tires, inner tubes, belts, hose and tubing, wire and cable jackets, footwear, sponges, coated fabrics, and a wide variety of coated or molded articles. They are characterized by excellent thermal stability properties and by a number of other advantageous properties, including excellent resistance to direct sunlight, oxygen and ozone, oil and other hydrocarbon solvents. They display unusually outstanding resistance to mechanical abrasion and to deterioration caused by flexing, stretching and the like.

The elastomeric properties of these materials may be varied by suitable compounding. The amount and type of compounding agent to be incorporated in the stock is dependent upon the use for which the elastomer is intended. The compounding agents ordinarily used in the rubber industry with either natural or synthetic rubber are useful with the products of this invention. These include carbon black, clay, silica, esterified silica particles, talc, zinc and magnesium oxides, calcium and magnesium carbonate, titanium dioxide and plasticizers. Inorganic and organic coloring agents may be incorporated to give well-defined colors, as the natural color of these elastomers is a pale yellow or light amber.

This application is a continuation-in-part of my application Serial No. 526,567, filed August 4, 1955, now abandoned.

As many widely different embodiments of this invention may be made without departing from the spirit and scope thereof, it is to be understood that this invention is not limited to the specific embodiments thereof except as defined in the appended claims.

What is claimed is:

1. Curable polymers comprised essentially of the recurring units

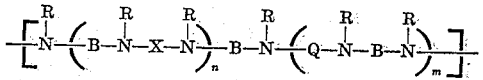

wherein the bivalent radical X is obtained by removing the terminal chlorine atoms from a polymeric bischloroformate having a molecular weight of at least 875 and having the formula

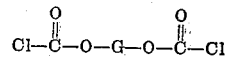

wherein O—G—O is a bivalent radical obtained by removing the terminal hydrogen atoms from a polymeric glycol selected from the group consisting of polyalkyleneether glycols, polyalkylene-aryleneether glycols, polyalkyleneether-thioether glycols, polyalkylene-aryleneether-thioether glycols, glycols of the formula HO—L—OH wherein L is a bivalent radical formed by the polymerization of ethylenically unsaturated hydrocarbon monomers at least 50% of which are conjugated dienes, and said glycols substituted by a side chain containing a potential curing site in the form of an aliphatic

group, with the remaining valences on the carbon atoms of said aliphatic

group being satisfied by monovalent substituents; B is a bivalent radical selected from the group consisting of alkylene radicals, arylene radicals and said radicals substituted by a radical containing a potential curing site in the form of a group selected from the class consisting of a hydroxyl group and an aliphatic

group, with the remaining valences on the carbon atoms of said aliphatic

group being satisfied by monovalent substituents; R is an aliphatic substituent selected from the group consisting of alkyl radicals, alkylene radicals, hydroxy alkyl radicals, alkenyl radicals, alkenyloxy radicals and alkenyl carbonyloxy radicals; with the proviso that when R is an alkylene radical, B is an alkylene radical, and the R's on both sides of the B radical are joined to form an alkylene radical so that the unit

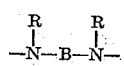

is a diazacycloalkylene ring; Q is a radical selected from the group consisting of a carbonyl radical and a nonpolymeric diacyl radical; n is an integer greater than zero and m is an integer including zero; said recurring units being connected by a radical selected from the group consisting of Q and X radicals, said radicals having the significance defined above; with at least 60% of the total weight of the polymer being the bivalent radicals X; with the proviso that said curable polymers contain at least one potential curing site for every 8000 units of molecular weight of polymer, said potential curing sites being in the form of a group selected from the class consisting of a hydroxyl group, a cyclobutene group and a side chain aliphatic

group with the remaining valences on the carbon atoms of said aliphatic

group being satisfied by monovalent substituents.

2. The polymer of claim 1 wherein at least one of the R radicals is hydroxyethyl.

3. The polymer of claim 1 wherein the bivalent radical X is obtained by removing the terminal chlorine atoms from a polyalkyleneether bischloroformate.

4. The polymer of claim 3 wherein the polyalkyleneether bischloroformate is a polytetramethyleneether bischloroformate.

5. The polymer of claim 4 wherein the bivalent radical B is an ethylene radical.

6. The polymer of claim 4 wherein the bivalent radical B is a methylene diphenyl radical.

7. The polymer of claim 3 wherein R is an alkenyl radical.

8. The polymer of claim 5 wherein R is an allyl radical.

9. The polymer of claim 6 wherein Q is a carbonyl radical.

10. The polymer of claim 4 wherein Q is a non-polymeric diacyl radical obtained by the removal of the terminal chlorine atoms from a non-polymeric bischloroformate.

11. The polymer of claim 10 wherein the nonpolymeric bischloroformate is obtained by reacting phosgene with a propanediol having a side chain containing an aliphatic

group with the remaining valences on the carbon atoms of said group being satisfied by monovalent substituents.

12. The polymer of claim 1 wherein at least one of the Q radicals has a side chain containing a terminal aliphatic $-CH=CH_2$ group with the remaining valence on the carbon atom of said group being satisfied by a monovalent substituent.

13. The polymer of claim 5 wherein the unit

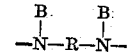

is a 1,4-piperazinylene ring.

14. A cured elastomer obtained by curing the polymers of claim 2 with an organic polyisocyanate.

15. The polymer of claim 1 wherein Q is a nonpolymeric diacyl radical containing a potential curing site in the form of a group selected from the class consisting of a hydroxyl group, a cyclobutene group and a side chain aliphatic

group with the remaining valences on the carbon atoms of said aliphatic

group being satisfied by monovalent substituents.

16. A cured elastomer obtained by heating the polymers of claim 12 to a temperature of at least about 125° C. with sulfur in the presence of vulcanization accelerators.

References Cited in the file of this patent

UNITED STATES PATENTS

| | | |
|---|---|---|
| 2,692,874 | Langerak | Oct. 26, 1954 |
| 2,731,446 | Wittbecker | Jan. 17, 1956 |
| 2,808,391 | Pattison | Oct. 1, 1957 |

FOREIGN PATENTS

| | | |
|---|---|---|
| 956,556 | France | Feb. 2, 1950 |

UNITED STATES PATENT OFFICE
CERTIFICATE OF CORRECTION

March 1, 1960

Patent No. 2,927,098

Earl J. Goldberg

It is hereby certified that error appears in the printed specification of the above numbered patent requiring correction and that the said Letters Patent should read as corrected below.

Column 1, line 51, for "essential" read -- essentially --; line 67, for "gycols" read -- glycols --; column 2, line 24, for "hydroxyl" read -- hydroxy --; line 25, for "akenyl" read -- alkenyl --; line 57, for "sits" read -- sites --; column 3, line 14, after "such as" insert -- a --; column 5, line 3, after "with" insert -- the --; line 11, for "proportion" read -- proportions --; line 31, for "bichloroformate" read -- bischloroformate --; same line, for "theioether" read -- thioether --; line 35, for "N.N'-" read -- N,N'- --; column 6, line 35, strike out "cyclobutene groups,"; lines 68 and 69, for "adtion" read -- addition --; column 10, line 21, for "alliphatic" read -- aliphatic --; column 14, line 35, for "anyhydrous" read -- anhydrous --; column 15, lines 69 and 70, for "moleculer" read -- molecular --; column 16, lines 28 and 29, for "nonpolymeric" read -- non-polymeric --; lines 32 to 34, for $$\overset{|\ |}{\text{"C=C"}} \quad \text{read} \quad -- \quad \overset{|\ |}{-\text{C=C}-} \quad --;$$

lines 49 and 50, for "nonpolymeric" read -- non-polymeric --.

Signed and sealed this 23rd day of August 1960.

(SEAL)
Attest:
KARL H. AXLINE
Attesting Officer

ROBERT C. WATSON
Commissioner of Patents